United States Patent [19]

Bartz et al.

[11] 3,987,122

[45] *Oct. 19, 1976

[54] THERMOPLASTIC ADHESIVE COMPOSITIONS

[75] Inventors: Kenneth W. Bartz, Baytown, Tex.; John J. Higgins, Westfield; Anthony J. Berejka, Cranford, both of N.J.; Amerigo J. DiCresce, Houston, Tex.

[73] Assignee: Exxon Research and Engineering Company, Linden, N.J.

[ * ] Notice: The portion of the term of this patent subsequent to Feb. 25, 1992, has been disclaimed.

[22] Filed: Sept. 27, 1974

[21] Appl. No.: 509,973

Related U.S. Application Data

[62] Division of Ser. No. 240,502, April 3, 1972, Pat. No. 3,868,433.

[52] U.S. Cl. .............................. 260/836; 156/327; 156/334; 260/27 R; 260/27 EV; 260/28.5 A; 260/28.5 AV; 260/876 R; 260/888; 260/889; 260/897 B

[51] Int. Cl.$^2$ .......................................... C08L 51/06
[58] Field of Search ............ 260/876 R, 878 R, 836

[56] References Cited
UNITED STATES PATENTS

| | | | |
|---|---|---|---|
| 3,658,948 | 4/1972 | McConnell | 260/876 R |
| 3,696,069 | 10/1972 | Schrage et al. | 260/878 R |
| 3,868,433 | 2/1975 | Bartz et al. | 260/876 R |

*Primary Examiner*—John C. Bleutge
*Attorney, Agent, or Firm*—David A. Roth

[57] ABSTRACT

Thermoplastic adhesive compositions such as hot melts containing conventional components are improved considerably by the inclusion of acid or acid derivative grafted polyolefins particularly acrylic acid-grafted polypropylene, polyethylene and/or ethylene-propylene polymer substances. Alternatively, novel adhesive compositions are prepared in which the polyolefin constituent is entirely a grafted polyolefin.

10 Claims, 3 Drawing Figures

THERMOPLASTIC ADHESIVE COMPOSITIONS

This is a division, of application Ser. No. 240,502, filed 4/3/72 now U.S. Pat. No. 3,868,433.

BACKGROUND OF THE INVENTION

A class of adhesive compositions known as thermoplastic or hot melt adhesives have enjoyed continually increasing usage in many industrial applications. These adhesives, or hot melts, as they are commonly designated, are solid or semisolid combinations of film forming resins, tackifying resins, rubbery polymers, plasticizers, waxes and similar materials which are added to the adhesive composition in order to impart various properties thereto.

Adhesive bonds derived from hot melts are particularly useful because (1) they are 100 percent solid materials and (2) they quickly form tough adhesive bonds simply by cookling--i.e. no need for solvent evaporation, etc.

Adhesive derived from hot melts are particularly useful because of their very rapid set up or bonding time. Strong bonds are formed when the adhesive cools below its melt point and crystallizes. There is no long wait for solvent or water evaporation or for chemical curing as with other type adhesives. Depending on composition, hot melt adhesives can be prepared having good tack, high bond strength, good flexibility, low temperature properties, good environmental resistance, etc.

A typical class of hot melt adhesive composition utilizes polyolefin polymers as the base or carrier material. The polyolefin base is usually blended with other polymers and copolymers, resin tackifiers and with modifiers and additives. Generally, the polyolefin carrier is polypropylene (either atactic or crystalline or both) or polyethylene but that is usually done for cost considerations and it is not necessary that it be so restricted from a technical standpoint.

In spite of the tremendous growth in the use of hot melts and the advantages to be realized by their use, the extent of their utilization has nevertheless been limited by several serious shortcomings. Polyolefins based hot melts, for example, usually suffer from the lack of strong adhesion to nonporous metallic surfaces such as aluminum, steel and the like. They also tend to be quite brittle unless suitably modified. All hot melts generally suffer from low bond strengths at elevated temperatures. When heated, even well below their melt points, they tend to soften and lose strength.

RELATED APPLICATIONS

There are no parent applications or related ones to this one filed by these inventors, although these are applications having related subject matter which are commonly assigned even though the inventors are different.

SUMMARY OF THE INVENTION

Hot melt compositions are prepared in which at least one of the conventional polyolefin components is partially or wholly grafted with a monomer such as acrylic acid or a derivative thereof to increase the adhesive bonding of the hot melt composition to nonporous metallic surfaces. Polypropylene with a relatively high melt flow rate, i.e. 10 to 500 grafted with from about 1 to 15 weight percent of acrylic acid is an especially preferred component of that composition.

DETAILED DESCRIPTION OF THE INVENTION

It has now been discovered and forms a unique feature of this invention that novel adhesive compositions can be prepared by replacing all or a portion of the polyolefinic components of a conventional hot melt adhesive formulation with a grafted polymer in which the graft is a polar monomer preferably unsaturated acid or derivative thereof which has been graft polymerized to the backbone of a bare polymer.

The term "adhesive" as used herein is in its classical sense a substance which holds materials together because of surface attraction. No one knows exactly what the theoretical basis is of adhesiveness. However, all experts will concur that the overriding important characteristic of an adhesive is that the things which are bonded together, i.e. substrates, must be difficult to separate. This probably comes about as a result of intimate contacting.

Thus when an adhesive is applied to a substance it must be fluid enough and surface-active enough to wet the substrate. Then it must be capable of hardening or setting so that it develops high cohesive strength. Preferably such cohesive strength is that comparable to what would be expected of a moldable thermoplastic or thermoset material.

Conventional hot melt adhesives are well known and comprise a wide variety of described systems and systems which are actually used in commerce. Very generally a major component will be a carrier polymer which can be a structurally strong polyolefin such as polyethylene or polypropylene to impart the high cohesive strength when the adhesive sets up after cooling. Other polymers used for their structural properties include nylons, vinyl acetate polymers, polyesters, polycarbonates, PVC, waxes, Saran and the like. But other components are usually blended in.

Thus, hot melts can have an elastomeric component such as ethylene-propylene rubber, (EPR) ethylene-propylene diene monomer terpolymer (EPDM), polyisobutylene, (i.e. vistanex, butyl rubber) chlorinated polyethylenes, chlorinated butyl rubbers, and the like.

Generally elastomers having a relatively low unsaturation or no unsaturation at all such as previously specified are used since it is desirable to avoid oxidation which occurs with highly unsaturated elastomers.

Furthermore, other polymers which are nonelastomeric can be blended in. They can include block copolymers of ethylene and propylene, random copolymers of ethylene and propylene with each other and with vinyl and allylic monomers such as vinyl acetate, styrene, acrylic acid, acrylates and the like. Thus, a wide variety of olefinic polymers and copolymers will be chosen by the blender in order to achieve the particular goals he has in mind.

Another conventional additive for hot melt adhesive compositions comprises resin and/or polymeric tackifiers. Generally the tackifiers comprise natural rosins, hydrogenated rosins, polyterpenes, terpene-phenolics, rosin esters, atactic polypropylene, petroleum hydrocarbon resins, polybutenes and chlorinated biphenyl resins containing from 30 to 65 percent of chlorine.

Various miscellaneous additives can be incorporated in the novel adhesive formulations of this invention. Of particular utility in adjusting viscosity and hardness is the use of waxes or the wax-like materials including, for example, petroleum waxes such as paraffin and microcrystalline wax, or synthetic waxes such as Fischer-Tropsch wax.

A detailed description of the preferred novel components of the adhesive compositions of the invention and how they are prepared or obtained is as follows:

In the compositions of the invention, it is possible to use graft polymers prepared by known methods in the art, e.g. those to be found in U.S. Pat. Nos. 3,177,269; 3,177,270; U.S. Pat. No. 3,270,090; British Pat. No. 1,217,231; British Pat. No. 679,562 and the like.

The preferred modifying monomers which are grafted to the backbone are $C_3$ and $C_{10}$ unsaturated mono- and polycarboxylic acids with preferably at least one olefinic unsaturation, anhydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, itaconic acid, citronic acid, acrylic acid, glycidyl acrylate, $C_2$ to $C_{20}$ alkyl cyano-acrylate, hydroxy $C_2$ to $C_{20}$ alkyl methacrylates, acrylic polyethers, acrylic anhydrides, methacrylic acid, crotonic acid, isocrotonic acid, mesaconic acid, angelic acid, maleic anhydride, itaconic anhydride, citraconic anhydride, acrylonitrile, and methacrylonitrile. Metal salts of the acids are useful.

Other monomers which can be used either by themselves or in combination with one or more of the carboxic acids or derivatives thereof include $C_{10}$ to $C_{50}$ vinyl monomers such as monovinyl aromatic compounds, i.e. styrene, chlorostyrenes, bromostyrenes, α-methyl styrene and the like.

Other monomers which can be used are $C_{10}$ to $C_{50}$ vinyl esters and allyl esters, such as vinyl butyrate, vinyl laurate, vinyl stearate, vinyl adipate and the like, monomers having two or more vinyl groups, such as divinyl benzene, ethylene dimethylacrylate, triallyl phosphite, dialkylcyanurate and triallyl cyanurate.

Nevertheless the most outstanding results and the highly preferred embodiments of this invention are those in which the graft copolymer meets some highly specific criteria. Primary is the concept that the graft copolymer not only contain grafted active functionality but that the backbone polymer itself be reduced considerably in melt viscosity so that it is more compatible with other components of the total adhesive composition and also exerts a much more powerful adhesive influence on the overall composition.

Thus grafted high melt flow polymers have a double adhesive action. One is obtained through the wetting activity of the more easily flowable polymer and the other is the chemical attraction of the active groups on the graft polymer, e.g. carboxylic acid groups, glycidyl groups, etc. This attraction is particularly useful on nonporous surfaces.

CHARACTERISTICS OF THE PREFERRED GRAFTED COMPONENT

The grafted polymer component of the inventive adhesive composition invention can be characterized in several respects. These are:

1. A melt index or MFR of from 1 to 1,000, preferably 10 to 250, most preferably 10 to 300 and even more preferably at least 25 percent, better at least 50 percent, and best at least 300 percent higher than that of a starting or base polymer having a melt index or MFR of from >1 to 20 as measured under conditions of ASTM Test No. D-1238-65T.

2. A graft comonomer content of from 0.1 to 50, preferably 1 to 25 and most preferably 2 to 10, based on the total weight of the graft copolymer.

3. A die swell at least 0.05 preferably 0.10 of a unit less than that of the base polymer.

The especially preferred component of the present invention utilizes a polymer produced by a process which involves grafting a polymer of a $C_2$ to $C_8$ mono-α-olefin or its copolymers with reactive monocarboxylic acid monomers. The polymers of $C_2$ to $C8$ mono-α-olefins are commonly referred to as polyolefins and for the purpose of this invention are to include copolymers of the $C_2$ to $C_8$ mono-α-olefins with each other and with other monomers as well as the homopolymers. Polymers having small amounts of a diolefin component such as butadiene and isoprene are also suitable.

The polyolefins are produced utilizing, in most instances a Ziegler-type catalyst, but can also be Phillips catalysts and high pressure technology. The processes for making the $C_2$ to $C_8$ polyolefins are well known and form no part of the present invention.

Examples of suitable polyolefins, both plastic and elastomeric, include low or high density polyethylene, polypropylene, polybutene-1, poly-3-methylbutene-1, poly-4-methylpentane-1, copolymers of monoolefins with other olefins (mono or diolefins) or vinyl monomers such as ethylene-propylene copolymer or with one or more additional monomers, i.e. EPDM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred polyolefins employed in the present invention contain propylene and/or ethylene, i.e. polypropylene and polyethylene. The starting polymer used as a base material in the present invention will preferably have a melt index (MI) of 0.1 to 40, preferably 5 to 40, and most preferably 15 to 40, or melt flow rate (MFR) between about 0.1 to 50 and preferably 0.1 to 5.0, most preferably 0.5 to 2. These melt flow rates correspond approximately to viscosity average molecular weights of about 500,000 to 200,000.

In the preparation of normally solid polymers of 1-olefins, certain rheological properties are frequently utilized for control purposes. One of these rheological properties more usually employed is melt index or melt flow rate which characterizes the processability of the polymers and is also an approximate indication of polymer molecular weight.

The melt index of polyethylene is measured normally according to the ASTM test D-1238-65T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing in combination with its plunger 2160 grams.

The melt flow rate (MFR) of polypropylene is determined by the same procedure except at a temperature of 230° C. according to ASTM D-1238-65T.

The apparatus utilized for determining melt index is defined in ASTM manual as a "deadweight piston plastometer."

Generally speaking, polypropylene from a reactor will have MFR below 1 up to 30 while polyethylenes from a reactor can have a MI of about below 1 to 40.

The preferred monomers to be grafted to the $C_2$ to $C_8$ polyolefin and other polymers according to the present invention are maleic anhydride, acrylic acid, methacrylic acid, glycidyl acrylate, hydroxy methacrylate and their derivatives. Others that can be used are described elsewhere herein. However, other monomers may be added in admixture with these such as maleic anhydride (MA), styrene, acid esters, salts and the like to form graft copolymers. MA and styrene and MA and acrylic acid are preferred over MA alone when polymer grafts of MA are desired.

The grafting reaction is initiated by a free-radical initiator which is preferably an organic peroxygen compound. Especially preferred peroxides are t-butyl benzoate, dicumyl peroxide, 2,5-dimethyl-2,5-di-tert-butylperoxy-3-hexyne (Lupersol 130), $\alpha,\alpha'$-bis(tert-butylperoxy)diisopropyl benzene (VulCup R), or any free-radical initiator having a 10-hour half-life temperature over 80° C. or mixtures thereof. Generally, the higher the decomposition temperature of the peroxygen compound, the better. See pp 66–67 of *Modern Plastics*, November 1971, which is incorporated hereby by reference, for a more complete list of such compounds.

AN ILLUSTRATIVE EMBODIMENT OF A PREFERRED PROCESS FOR PREPARING THE GRAFT POLYMER COMPONENTS OF THE INVENTION

Figures 1, 2, 3:
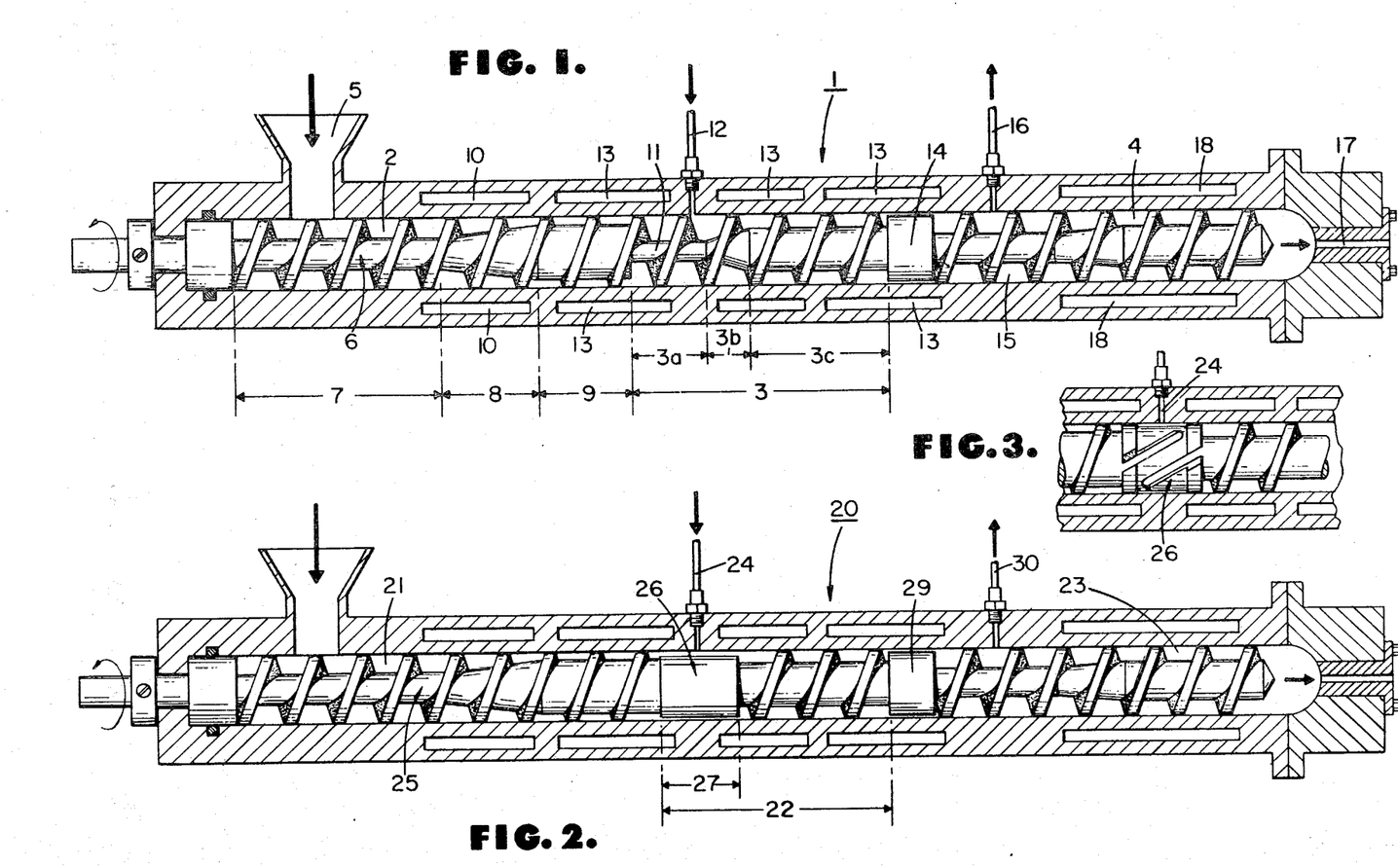
FIG. 1 is a schematic view of one preferred extruder apparatus embodiment for carrying out a process for making a preferred component of the present invention wherein an initiator is added to a decompression zone.
FIG. 2 is a schematic view of another preferred extruder apparatus embodiment wherein a high shear-thin film zone under high pressure conditions is provided for appropriate polymer reactions and for exceptionally good mixing.
FIG. 3 is a schematic view of a special "Egan" mixer which can be used in the apparatus of FIG. 2.

Referring to FIG. 1, an extruder 1, having a feed zone 2, a reaction zone or chamber 3, and a final metering zone 4 is utilized to carry out a preferred embodiment of the grafting process of the present invention.

In effect, polypropylene of a predominantly isotactic crystalline nature is introduced into a hopper 5 in the feed zone 2 of the extruder 1. The extruder screw 6 in feed zone 2 can be of various conventional designs such as a feed portion 7, a transition portion 8 and a first stage metering portion 9.

In feed zone 2, the polypropylene is heated by heaters 10 to a barrel temperature in the range of 400° to 650° F., preferably 400° to 550° F. It is one of the advantages of this invention that fairly low temperatures can be used to accomplish outstanding modification. In processes utilizing $O_2$ as an initiator, much higher barrel temperatures, i.e. about 600° to 800° F. are required and control is awkward. In processes utilizing heat alone, even higher temperatures and reaction times are necessary.

Extruder screw 6 has a root (sometimes called core) starting at the initial boundary of reaction zone 3 with a reduced cross-sectional area 11. This provides additional volume for reaction zone 3. When polymer under pressure reaches zone 3, the increased available volume results in a pressure drop, i.e., decompression, so that particular mass of polymer is not subjected to the ordinarily high pressures in the extruder.

An injection line 12 connects reaction zone 3 to a source of initiator, preferably a peroxide. In some instances the peroxide will be combined with a active monomer. For the purposes of this specific embodiment, the monomer is acrylic acid and the initiator is VulCup R.

Injection of initiator or initiator and monomer at this point, where low pressures in zone 3 prevail, provides thorough dispersion of the initiator in polypropylene over an extremely short period of time and appreciable scission or degradation of the polypropylene result. Appropriate controls of the polypropylene feed rate and screw speeds are maintained.

The process of the invention can be conveniently operated to give high throughputs with good quality. In this particularly preferred embodiment, the initiator and acrylic acid are added as a liquid blend to zone 3. When only degradation is desired, initiator alone or initiator dissolved in a solvent is introduced into zone 3.

It has been found that appreciable degradation of the polypropylene occurs when the back pressure against the liquid mixture of initiator and acrylic acid in injection line 12 is less than about 100 psig, preferably about 0 psig.

The pressure in injection line 12, therefore, provides one indicia that the polypropylene feed rate and screw speed are being appropriately controlled for the particular products desired.

The resulting graft copolymers of the present invention have been appreciably degraded and changed in molecular weight distribution as compared to the base polymer. This is demonstrated by the fact that the graft copolymers of the invention have a lower die swell than the polypropylene base stock used in making the copolymer. Lower molecular weights are also indicated by changes in melt flow rates.

The portion of the extruder heated by heaters 13 will have a temperature of from about 160° to 450° F., preferably 250° to 350° F. The important thing is that the polymer be substantially in a melt phase during the reaction. The extruder screw 6 in the latter portion of reaction zone 3 can have any desired root cross-sectional area desirable to provide for pumping and ancillary mixing if desired and to allow residual reactants to complete their reaction.

It is to be noted tht some homopolymerization of the acrylic acid (or any other monomer) to form polyacrylic acid also occurs. But this usually does not exceed 30 percent of the total acrylic polymer formed, particularly at the low monomer concentrations.

Preferably, the decompression portion 3a of the screw is immediately followed with transition zone 3b of gradually increasing screw root cross-sectional area followed by a metering zone 3c of constant cross-sectional screw root area.

Thereafter, extruder screw 6 has a melt seal (also called cap or blister) 14 which prevents the free escape of initiator and acrylic acid from reaction zone 3.

Screw 6 also has a second decompression portion 15 following blister 14.

Vent line 16 (which can be optionally provided with vacuum, if desired) is positioned above decompression portion 15 to remove gases or vapors. When operating without vent line 16, blister 14 may be omitted.

The graft copolymer and homopolymer blend is then passed through metering zone 4 where it is extruded from a die 17 at the end of extruder 1.

The extruder barrel temperature heated by heaters 18 in metering zone 4 is in the range of 350° to 550° F., preferably 350° to 450° F.

Referring now to FIG. 2, extruder 20, having a feed zone 21, a reaction zone 22 and a final metering zone 23, is also utilized to carry out the grafting process of the present invention. The process is generally similar to that described above for FIG. 1, except as follows. In one preferred embodiment, the initiator and acrylic acid are injected through injection port 24 at a point where the extruder screw 25 has a root 26 of very large cross-sectional diameter. The clearance between this portion of the root and the interior of extruder 20 is very small and will vary with extruder size. In the preferred 2 inch Egan extruder apparatus of the invention, this clearance is from 5 to 50, preferably 10 to 25, and most preferably 10 to 20 mils.

In another preferred embodiment shown in FIG. 3, the root of increased cross section or mixing device 26 is shown with a series of channels cut in the perimeter of the device. This results in a series of dead end channels. Under pressure, this forces the polymer out of the inlet channels and across the outer surface to the outlet channel. Other suitable devices could be used.

The novelty and unobviousness of the invention reside in the combination of such a mixing device with means to introduce reactants at a relatively early stage in the extrusion process.

In any event, whether the embodiments of FIG. 2 or FIG. 3 is used, the polymer outlet velocity is increased and forms a thin fluid film under relatively high shear as compared to the other portions of the extruder.

The initiator and/or acrylic acid are injected at pressures which range between 200 and 5,000 psi or more specifically, between 500 and 3,500 psi. At these high pressures and because only a thin film or polypropylene is present at the high shear-thin film zone 27 of reaction zone 22, intensive, instantaneous mixing followed by appreciable degradation of the polymer, e.g. polypropylene, occurs.

Extruder 20 is also provided with a blister 29 and a vent 30. As in the case of the FIG. 1 extruder, both the vent and blister may be eliminated if desired.

As illustrated by the two embodiments of FIG. 1 and FIG. 2, various extruder designs may be employed to carry out the graft copolymerization process of the present invention. However, the common characteristic of each extruder design is that thorough, instantaneous mixing of the initiator and acrylic acid with the polymer, i.e. polypropylene, occurs. The extremely high degree of mixing which characterizes the process of the present invention is evidenced by appreciable degradation of the polymer. Evidence for the appreciable degradation of the polyolefin is shown by the substantial increase in the melt flow rate or melt index of the copolymer over the base resin. Evidence for a narrowing of the molecular weight distribution is seen from the fact that the die swell of the graft copolymer is lower than the die swell of the polyolefin base stock used in making the copolymer. It is to be emphasized that a change in molecular weight distribution leads to many useful and novel properties of the resulting polymers.

DIE SWELL

Some high molecular weight polymers such as polyolefins when forced through a capillary die of a relatively short length produce an extrudate of a larger diameter than the diameters of the capillary.

This property of polymers has been characterized as die swell which is expressed numerically as the ratio of the diameter of the extrudate to the diameter of the capillary (by some the ratio to the first power and by others to the second power). The term "die swell" as used herein is defined as follows:

$$\text{die swell} = \left(\frac{D_e}{D_o}\right)^2$$

where:
$D_e$ is the extrudate diameter
$D_o$ is the capillary diameter.

The numerical value of die swell is also dependent on the geometry of the rheometer used to force the polymer through the capillary. In obtaining the numerical values set forth herein, and in the tablets which follows, a rheometer having a rheometer barrel of ⅜ inch I.D. (inside diameter) was used wherein the barrel was heated to a temperature controlled to ±2° F. of the recorded temperature and the polymer was forced through a capillary having a 0.03018 inch I.D. and which was 1.006 inch long. The capillary had a 90° entry angle.

The measurements were made by forcing the polymer through the capillary by a plunger operating at a constant speed or a constant shear rate ($\gamma$) ranging from 13.5 reciprocal seconds to 338.3 reciprocal seconds ($\sec^{-1}$). The polymer was forced through the capillary into ambient air at room temperature (70° – 80° F.).

The measurement of die swell is frequently used as a gross measure of molecular weight distribution in polyolefins; high die swell resin possess broader molecular weight distribution than polymers having lower die swells.

Thus, the polymers of the invention have die swells lower than the base stock from which they were prepared, are the product of a random chain scission process, which results in molecular weight degradation and hence possess narrower molecular weight distribution than the base polymers.

It should be noted that the exceptionally high MFR grafted polymers (i.e. those having a MFR of about 20 to 1,000) can also be made by utilizing a starting polymer having a MFR in that range and conventionally grafting and/or additively degrading.

Films and coatings made from the grafted polymers or laminated or coated on other films or structures made from polar monomers, show outstanding properties. Nylon and other polar materials can be used as a base structure.

To summarized, the graft copolymers of the present invention have outstanding utility due to their unique chemical and physical properties as bonding agents, adhesives and coatings. The graft copolymers are expecially good as adhesives for metals and can be used in forms such as adhesive sheets, tapes, or laminated products. They can be added to conventional adhesive compositions.

GENERAL REACTION CONDITIONS

The free-radical initiator is used in amounts corresponding to 0.005 to 5, preferably 0.02 to 2, most preferably 0.02 to 1.0 weight percent based on polymer.

The monomer to be grafted polymerized is used in amounts of 0.01 to 100, preferably 0.05 to 50, and most preferably 0.1 to 25 weight percent of the base polymer. An especially preferred range is from 0.1 to 15. High graft conversions are obtained at these levels. Furthermore, adhesion properties are also greatly enhanced over the base polymer, even with such low quantities of graft.

Generally, the monomer and initiator are blended together and added simultaneously, except in the situation of a polyethylene or ethylene predominant copolymer.

Therefore, in the description of the process, from time to time certain differences in the applicable process conditions must be employed when the primary characteristics of the polymer are determined as a result of its ethylene content.

It is also to be noted that the process is applicable to elastomers of all classes which are capable of being handled by an extruder. Examples include natural rubber, polyisobutylene, butyl, chlorobutyl, polybutadiene, butadiene-styrene, ethylene-propylene, ethylene-propylene diene terpolymer elastomers and mixtures thereof with each other and with thermoplastic polymers. Blends of elastomers and plastics in any portion particularly benefit from being processed by the technique of the invention.

One class of carriers or base used for the adhesives of this invention may be either polyethylene, isotactic (i.e. crystalline) polypropylene or atactic, i.e. amorphous, polypropylene. The polyethylene utilized as a carrier may range in molecular weight from about 2,000 to about 21,000.

It is preferred, however, to employ polyethylene having a molecular weight of from 8,000 to 12,000. The isotactic polypropylene suitable for use as a carrier in the adhesives of the invention should have a melt flow (as determined by ASTM Method D 123-57T) ranging from 5 to 500. However, exceptionally low molecular weight isotactic polypropylene having a melt viscosity of from 3,000 centipoises to 5,000 centipoises at 350° F. can also be used, as a carrier, to prepare the hot melt adhesives. As for the atactic polypropylene, it should have a melt viscosity in the range of from about 1,000 to 15,000 centipoises as determined, at 350° F, using a Brookfield RVS viscometer with a No. 6 spindle at a spindle speed of 20 rpm. (It is to be noted that all melt viscosities referred to in this disclosure were determined under the latter conditions.) Blends of any two or more of the three above described resins can, if desired, be employed as carriers for the novel adhesives.

In general, since the grafted polyolefin plastic materials tend to be somewhat more brittle than their base polymer, inclusion of quantities of rubbery polymers such as the ethylene-propylene elastomers tend to greatly improve the flexibility of the resulting composition. These elastomers can also be grafted.

Furthermore, in addition to improving the flexibility of the grafted polymer, the inclusion of suitable rubbery polymer also permit grafted polymers to maintain physical strength when extended with materials such as waxes, resins, oil, etc. This is an important consideration which can both lower the cost of a final composition as well as reduce the molten viscosity of the compositions containing appreciable quantities of the modified polyolefin.

The resin and polymeric tackifiers heretofore described can be present in the formulations of this invention in amounts ranging from about 10 to 1,000, preferably 20 to 500, and most preferably 50 to 250 parts per 100 parts, by weight, of elastomeric component.

When a wax is added to the formulation, it can be present in amounts ranging from about 50 to about 500, preferably 50 to 250, and most preferably 100 to 200 parts, by weight, of the elastomeric component. As far as the polyolefin carrier is concerned, it may be present in amounts ranging from about 50 to about 1,500 parts per 100 parts, preferably 75 to 500, and most preferably 100 to 250 parts, by weight, of the elastomeric component copolymer.

It will be understood that either all or a part of the elastomeric component or the plastic, i.e. carrier component can be grafted.

In preparing their adhesive compositions of the invention, the polyolefin plastic and elastomer components can be preblended before undergoing grafting in an extruder as previously described. Conversely, either one of these components can be extruder grafted separately and then blended with the other, non-grafted component (or both can be grafted separately and then blended) in a high shear mixer such as a Banbury, mill, kneader, mixing extruder, etc.

When tackifiers, i.e. resins, modifiers i.e. EVA's, diluents i.e. waxes and additives are used, the thermoplastic components are placed in a heated kettle, churn, kneader or mixer and melted at a temperature ranging from 200° to 400° F. The grafted polyolefin plastic or grafted polyolefin plastic/elastomer blend plus other additives are then slowly stirred into the molten mix. The entire mixture is then blended while hot until a smooth, homogeneous composition is obtained.

The final hot melt adhesive composition can then be used directly, or it can be extruded in rope or pellet form or reduced to a chip or powder form for use in an appropriate hot melt applicator. It may also be cast or extruded into a film or web form for subsequent use. In such shaped forms, it can be placed between the substances to be bonded and then activated by heat and pressure. It should be noted that the adhesives of this invention can be applied by any of the hot melt applicators commonly used by the practitioner. Although these compositions can be applied in any thickness the practitioner finds expedient, it is preferred to employ coating thickness of from 0.5 mil to 25 mils.

Since the grafted polyolefins are relatively insoluble in diluent oils such as paraffinic rubber process oils, i.e. commercial products such as Flexons, the fine particles formed from the grafted polyolefins could be used to apply these materials in the form of plastisols.

The grafted polyolefins such as polypropylene made by the preferred technique described herein exhibit exceptionally high adhesive strength at moderately elevated temperatures, i.e. about 250 psi aluminum to aluminum lap shear adhesions at 250° F. The hot bond strength of the hot melt is considerably higher than can be obtained in conventional hot melts.

Simply blending the modified grafted polymer in with the hot melt components to give a final hot melt composition will improve the adhesive properties considerably. For instance, a 60/40 blend of 6 percent acrylic acid modified polypropylene and 40 percent of Vistalon 3708 which is a commercially available ethylene/propylene elastomer had a 600 psi lap shear aluminum to aluminum bond strength at 72° F. The blend also had about 13 pounds per inch at 180° F. peel adhesion to aluminum foil.

Therefore, it should be noted that although blending the graft component with the other components of the hot melt composition is an important feature of the present invention, an especially preferred embodiment of the invention comprises blending the plastic carrier and the other olefinic components, e.g. elastomers, in the plastic carrier prior to addition of tackifiers, waxes, and other materials and grafting the monomers according to the foregoing extruder grafting process directly to the blend of elastomer and plastic. Subsequently the other compounds can be introduced into the grafted component resulting in the final hot melt composition.

For instance, when the 60/40 polypropylene/Vistalon 3708 blend previously mentioned was grafted directly with acrylic acid in the extruder modification process of the invention, the resulting grafted composition gave 180° F. peel adhesion values of about 25 pounds per inch. Thus the adhesion improved about 100 percent, when elastomer and plastic hot melt constituents were extruder-grafted together.

failures that occur are either cohesive or boundry layer failures. The conventional materials of the art based on ethylene vinyl acetate components tend to fail adhesively.

Cohesive failure occurs when the bonded joint fractures within the adhesive layer. Adhesive failure occurs when the polymeric adhesive strips cleanly form the test substrate. Boundry layer failures are similar to cohesive failures in that they occur within the mass of the adhesive itself, but differ in that they occur in the layer of the adhesive mass most proximate to the test substrate. With a boundry layer failure there is a thin residue of adhesive left on the test substrate.

The invention is further illustrated by the following examples:

EXAMPLE 1

Several different materials were evaluated in lap shear adhesion tests and tension adhesion tests. These materials were an acrylic acid modified polypropylene containing 6 weight percent acrylic acid (~sumer) prepared according to the method disclosed-above; a 60/40 blend of that polypropylene with Vistalon 3708, a commercially available ethylene/propylene diene monomer elastomer and an Elvax 150 ethylene vinyl acetate polymer. The results are summarized below in Table I.

TABLE I

| | LAP SHEAR AND TENSION ADHESION RESULTS WITH ACID MODIFIED POLYPROPYLENE | | |
|---|---|---|---|
| | Acrylic Acid Modified Polypropylene | 60/40 Blend Acid pp- VISTALON 3708 | Ethylene- Vinyl Acetate Elvax 150 |
| Lap Shear Adhesion (Al to Al pulled at 0.2 in./min.) | | | |
| at 72° F, psi: | 1250 boundry layer failure | 585 cohesive failure | 500 mixed cohesive- adhesive failure |
| at 250° F, psi: | 250+ | 105 cohesive failure | 0 melted and flowed |
| Tension Adhesion (Al to Al pulled at 0.2 in./min.) | | | |
| at 72° F, psi: | 1040 boundry layer failure | 480 cohesive failure | 550 adhesive failure |

Notes:
Elvax 150 is an ethylene-vinyl acetate copolymer containing 33% vinyl acetate. This particular grade is recommended by DuPont for high specific adhesion to aluminum and other nonporous surfaces.
250 lbs. was the maximum force which could be detected by the load cell on the tensile tester encased in a convenient to use heated chamber.
In some earlier work involving the use of carboxy terminated polyisobutylene to modify epoxies, lap shear adhesion results for a control of a commercial epoxy adhesive were 790 psi at 72° F. and 100 psi at 250° F.
Test specimens were formed by applying molten polymer to pre-heated pieces of aluminum. Only hand pressure was used to achieve adequate surface contact.

Thus there are some very significant advantages to be realized by utilizing the technique of the invention. These can be summarized as follows:
a. very high shear bond strength can be obtained,
b. these very high bond strengths can be maintained at elevated temperatures.

Bond strengths comparable to commercial products can be obtained even when the grafted produt is flexiblized with an elastomer. When materials are bonded to metal surfaces using the compositions of the invention,

EXAMPLE 2

The same compositions as described in Example 1 were further evaluated in 180° peel test.

Furthermore, various blends of acrylic acid modified polypropylene, ethylene/propylene copolymer and Vistanex MML-120 which is a polyisobutylene were evaluated in the 180° peel test. The results of these tests are summarized below in Table II.

TABLE II

PEEL ADHESION RESULTS WITH ACID MODIFIED POLYPROPYLENE

|  | Acrylic Acid Modified Polypropylene | 60/40 Blend Acid pp-VISTALON 3708 | 60/40 Blend pp/VISTALON 3708 (Modified after Blending) | Ethylene Vinyl Acetates | |
|---|---|---|---|---|---|
|  |  |  |  | Elvax 150 | Elvax 260 |
| 180° Peel, ppi: (Al foil to plastic, pulled at 2 in./min., at 72° F) | 7.5 boundry layer failure | 13.5 boundry layer failure | 25 — | 11.0 adhesive failure | 5.0 |

Acid pp - Rubber Blends

|  |  |  |  |  |  |
|---|---|---|---|---|---|
| Acrylic Acid pp | 10 | 20 | 30 | 60 | 50 |
| VISTALON 3708 | 90 | 80 | 70 | 40 | — |
| VISTANEX MM L-120 | — | — | — | — | 50 |
| 180° Peel, ppi: (Al foil to plastic, pulled at 2 in./min., at 72° F) | 3.5 | 3.0 | 5.0 | 13.5 | 13.5 |

Notes:
Unmodified polypropylene and unblended VISTALON 3708 have no adhesion at all to aluminum foil when such samples were prepared in the same manner.

By itself, acrylic acid modified polypropylene is brittle. The 60/40 blend with VISTALON 3708 and the 50/50 blend with VISTANEX MM L-120 are stiff materials, but not brittle. The blends which were predominately VISTALON 3708 were very flexible and rubbery similar to adhesive grades of ethylenevinyl acetate copolymers.

Test specimens were prepared by molding pads at 350° F with aluminum foil covering one-half of the mold cavity. The bonding pressure was only the force exerted by the viscous, molten polymer since the mold cavities had open edges and were not completely closed.

EXAMPLE 3

A series of compositions corresponding primarily to those described above were also tested in the 180° peel test which comprised bonding cotton duck to different samples of plastic with a modified CHLOROBUTYL rubber which had been dissolved in solvent. CHLOROBUTYL is a commercially available linearly chlorinated butyl rubber. The results are summarized below in Table III.

TABLE III

COLD BONDING TO ACID MODIFIED POLYPROPYLENE

|  | Unmodified Polypropylene Escon 115 | Acrylic Acid Modified Polypropylene | 60/40 Blend Acid pp-VISTALON 3708 | Ethylene-Vinyl Acetate Elvax 150 |
|---|---|---|---|---|
| 180° Peel, ppi: (Cotton duck to plastic, pulled at 2 in./min., at 72° F) | 3.3 adhesive failure peaks to 3.5 ppi | 4.0 mixed cohesive - adhesive failure peaks to 6.0 ppi | 2.0 mixed cohesive - adhesive failure peaks to 4.0 ppi | 2.3 adhesive failure peaks to 2.5 ppi |

Notes:
The material used to bond the cotton duck to the different samples of plastic was simply a modified CHLOROBUTYL rubber dissolved in Solvent with no additional adhesion promoters, tackifiers or reinforcing agents. This material was found to have only 0.5 ppi 180° peel adhesion to steel and to exhibit at most 4.3 ppi adhesion to steel, but with cohesive failure when modified with an adhesion promoter.

The more erratic peel adhesion results with higher peak values together with the tendency to exhibit cohesive failures within the cold bonding adhesive indicates that this modified CHLOROBUTYL adhered better to the acid modified polypropylene than to conventional polypropylene.

Test specimens for these cold bonding adhesion tests were prepared by first coating the cotton cloth and the plastic with the rubber cement. After allowing this first coat to dry, a bonding coat was applied to the cloth and plastic which were then pressed together. Peel tests were run several days later to ensure complete solvent evaporation.

EXAMPLE 4

Various compositions described above were evaluated in terms of their solvent resistance in various solvents. The results are summarized below in Table IV.

TABLE IV

SOLVENT RESISTANCE OF ACID MODIFIED POLYPROPYLENE

|  | Unmodified Polypropylene Escon 115 | Acrylic Acid Modified Polypropylene | 60/40 Blend Acid pp-VISTALON 3708 | Ethylene Vinyl Acetate Elvax 150 |
|---|---|---|---|---|
| After 24 hours immersion in |  |  |  |  |
| Toluene: | unchanged | unchanged | swelled | dissolved |
| Hexane: | unchanged | unchanged | swelled | dissolved |
| Isopropanol: | unchanged | unchanged | unchanged | lost adhesion |
| Perchlorethylene: | unchanged | unchanged | swelled | dissolved |
| Methyl ethyl ketone: | unchanged | unchanged | unchanged | dissolved |

TABLE IV-continued
SOLVENT RESISTANCE OF ACID MODIFIED POLYPROPYLENE

|  | Unmodified Polypropylene Escon 115 | Acrylic Acid Modified Polypropylene | 60/40 Blend Acid pp- VISTALON 3708 | Ethylene Vinyl Acetate Elvax 150 |
|---|---|---|---|---|
| Soapy water: | unchanged | unchanged | unchanged | unchanged |

Notes:
The test specimens which showed no significant change or only swelling after 24 hours of immersion did not change noticeably after being immersed for one week.
Unmodified polypropylene, Escon 115, showed some softening after one week in hexane, in toluene and in perchlorethylene, but not to any significant degree.
With the exception of the Escon 115 samples, all immersion tests were made on polymer specimens which had been bonded to aluminum foil for the 180° peel adhesion tests. While not dissolving or changing shape, the Elvax 150 disbonded from the foil when immersed in isopropanol. The acid modified polypropylene showed no signs of disbonding in any of the solvents. The blend of acid modified polypropylene and VISTALON 3708 swelled in three solvents, toluene, hexane and perchlorethylene, which caused marked distortion and curling of the test specimens but gave little evidence of disbonding.

EXAMPLE 5

Various blends of the same acid modified polypropylene were prepared with other thermoplastic diluents which are commercially available. The products were evaluated with respect to flexibility, appearance and adhesion to metal. The results are summarized below in Table V.

modified so that it has strong adhesion properties, it tends to adhere strongly to metal surfaces of the Banbury or other high shear mixing apparatus which is being used to mix the modified polypropylene with elastomer.

EXAMPLE 6

In this example, a diluent more nibsly acid-modified

TABLE V
BLENDING WITH THERMOPLASTIC DILUENTS

| Acid Modified PP | 50 | 50 | 60 | 60 | 50 |
|---|---|---|---|---|---|
| VISTALON 3708 | — | — | 40 | — | — |
| Eastobond M-5H (amorphous PP) | 50 | — | — | — | — |
| Amoco C-60 Polypropene | — | 50 | 80 | — | — |
| Elvax 150 | — | — | — | 40 | — |
| Bareco 190° F Microwax | — | — | — | — | 100 |
| Flexibility & Appearance | very brittle, polymer film weak & "cheesy" | very brittle, wax-like, polymer film weak & "cheesy" | good flexibility, polymer film fairly tough | brittle, marginal compatibility in film | very brittle, hard & wax-like |
| Adhesion to Metal | poor | fair | good | fair | poor |

Notes:
Blends prepared by heating a small can of PP on a hot plate and manually stirring in diluents. Blending liquid additives into rather viscous PP was accomplished with difficulty. Localized discoloration and breakdown occurred in many cases because of overheating.

NOTE: Another reason other than the adhesion strength developed for preferring to blend the plastic plus elastomer prior to extrusion and grafting is that frequently blending the graft and the elastomer subsequent to the formation of just the plastic graft alone is much more difficult because of the incompability of the two components. Once the polypropylene has been polypropylene was blended with other materials commonly used in hot melts, such as the ethylene vinyl acetate copolymers, to improve their hot bond strength. Acid-modified polypropylene was also added to a polymer/wax blend based hot melt and imparted adhesion properties to it. The results are summarized below in Table VI.

TABLE VI
ACRYLIC ACID MODIFIED POLYPROPYLENE AS AN ADDITIVE IN THERMOPLASTIC POLYMERS

| Compound | Control | Ethylene Vinyl Acetate | | | | Ethylene-Propylene Copolymer | |
|---|---|---|---|---|---|---|---|
| 200 MFR, 14 % Acid Polypropylene | 100 | 50 | 50 | 25 | — | 50 | — |
| Elvax 210 Ethylene Vinyl Acetate | — | 50 | — | — | — | — | — |
| Elvax 40 Ethylene Vinyl Acetate | — | — | 50 | 75 | 100 | — | — |
| 25/75 EPM/Wax Blend[(2)] | — | — | — | — | — | 50 | 100 |
| Molten Blend Compatibility (ability to make a uniform blend from polymer pellets using only hand stirring) | — | Blends in Well at 350° F. | | | — | Blends at 350° F | — |
| 180° Peel Adhesion, Pounds Per Inch (aluminum foil to molded polymer pad, pulled at 2 in./min.) | | | | | | | |
| - Initial | 2.9 | 2.8 | 2.3 | 6.5 | 6.0 | 2.8 | 0 (no adhesion fell off foil) |
| - After Hot Water Immersion (24 hrs. in 140° F. water) | 3.5 | 3.5 | 2.3 | Distorted Could Not Be Tested | | 3.0 | — |
| Lap Shear Adhesion, psi (Al to Al, pulled at 0.2 in./min.) | | | | | | | |
| - at 72° F. | 700 | 425 | 375 | 330 | 210 | 935 | — |

TABLE VI-continued

| ACRYLIC ACID MODIFIED POLYPROPYLENE AS AN ADDITIVE IN THERMOPLASTIC POLYMERS | | | | | | |
|---|---|---|---|---|---|---|
| Compound | Control | Ethylene Vinyl Acetate | | | Ethylene-Propylene Copolymer | |
| - at 250° F. | >250 | 1 | 45 | 2 | 1 | 52 | — |

Notes:
[1]The poor lap shear adhesion of 50/50 acid modified polypropylene with Elvax 40 at 250° F is probably caused by the much lower molecular weight of the Elvax 210.
[2]The 25/75 EPM/Wax Blend consisted of 25 % of an ethylene-propylene copolymer containing ~90 % $C_2$ and 75 % of a wax blend consisting of 82 % paraffin wax and 12 % microcrystalline wax.
[3]Blends of 200 MFR acid with some materials such as SBR block elastomers was difficult and the blends were brittle.
[4]The grafted compound considerably improves the adhesion values of conventional hot melt blends.
[5]The 200 MFR graft was easier to work with in the molten stage than the 50 MFR grafts, even though it was more brittle when cooled.

EXAMPLE 7

In this example a series of experiments were carried out to demonstrate that acid grafted blends of polypropylene and a rubbery ethylenepropylene rubber can accept diluents and still retain adhesive properties. These diluents lower the molten viscosity of these melts.

The results are summarized below in Table VII and VIIa.

TABLE VII

EFFECT OF DILUENTS ON ACRYLIC ACID MODIFIED EP RUBBER/POLYPROPYLENE BLEND

| Composition | | | | | | |
|---|---|---|---|---|---|---|
| 4 % Acid 60/40 PP/EPDM Blend | 100 | 50 | 50 | 50 | 50 | 50 |
| Eastobond M5H Amorphous Polypropylene | — | 50 | — | — | — | — |
| Parmo Petrolatum | — | — | 50 | — | — | — |
| Indopol H-100 Polybutene | — | — | — | 50 | — | — |
| Jayflex 205 Naphthenic Plasticizer | — | — | — | — | 50 | — |
| FLEXON 845 Paraffinic Oil | — | — | — | — | — | 50* |
| 180° Peel Adhesion, Pounds Per Inch (Aluminum foil to molded polymer pad, pulled at 2 in./min.) | | | | | | |
| - Initial | 16.5 | 5.8 | 4.0 | 2.2 | 2.5 | 1.5 |
| - After Hot Water Immersion (24 hrs. in 140° F water) | 12.0 | 4.0 | 3.6 | 2.5 | — | 1.3 |
| Lap Shear Adhesion, psi (Al to Al, pulled at 0.2 in./min.) | | | | | | |
| - at 72° F | 860 | 270 | 300 | 210 | 120 | 150 |
| - at 250° F | 148 | 25 | 48 | 40 | 35 | 24 |

Notes:
1. All blends were prepared by hand stirring polymer pellets into the heated diluent. Diluent concentration is equivalent to 250 parts per hundred rubber.
2. Data indicates potential for plastisol type adhesives. *Did not swell polymer pellets after 3 weeks.

TABLE VIIa

EFFECT OF PLASTICIZERS ON ACRYLIC ACID MODIFIED EP RUBBER/POLYPROPYLENE BLEND

Polymer pellets were immersed in plasticizer on a 1 to 1 basis of polymer to plasticizer. These were stored for 3 weeks at room temperature. Observations were then made as to the relative degree of pellet swell.

| Plasticizer Composition | Listing in Order of Relative Swell | |
|---|---|---|
| FLEXOL 845 paraffinic oil | 0 | no swell |
| 50/50 FLEXON 845/DTDP | 1 | |
| 50/50 FLEXON 845/Jayflex 205 | 2 | |
| Ditridecyl phthalate | 3 | |
| 50/50 DTDP/Jayflex 205 | 4 | |
| Jayflex 205 naphthenic oil | 5 | 100% volume increase |

It is to be noted that besides reducing costs, the diluents reduce the molten viscosity of the tough cut flexible blend of grafted polypropylene/ethylene propylene copolymer elastomer.

EXAMPLE 8

This example demonstrates that, compared to ethylene-ethyl acrylate polymers designed for use as hot melt adhesives, the acrylic acid grafted polypropylenes and blends modified with a rubbery elastomer show significantly greater adhesion at elevated temperatures.

A series of compositions were prepared to illustrate this point. The results are summarized below in Table VIII.

TABLE VIII

EVALUATION OF UNION CARBIDE'S ETHYLENE-ETHYL ACRYLATE COPOLYMERS

| Polymer | Union Carbide DPD 6169 (EEA) | Union Carbide 9169 (EEA) | PPAA-14 | PPAA-6 | 60/40 Blend PPAA-6 VISTALON 3708 | (PPAA/3708)-4 |
|---|---|---|---|---|---|---|
| Description | ethylene-ethyl acrylate copolymer | ethylene-ethyl acrylate copolymer | acrylic acid grafted polypropylene | acrylic acid grafted polypropylene | blend of grafted pp and EPDM | acrylic acid grafted 60/40 blend of pp and VISTALON 3708 |
| Acrylic content | 18 % | 18 % | ~14 % | ~6 % | ~4 % | ~4 % |

TABLE VIII-continued
EVALUATION OF UNION CARBIDE'S ETHYLENE-ETHYL ACRYLATE COPOLYMERS

| | | | | | | |
|---|---|---|---|---|---|---|
| Melt index, 190° C | 6 | 20 | — | — | — | — |
| Melt flow rate, 230° C | — | — | ~200 | ~50 | — | ~1.8 |
| Adhesive Properties | | | | | | |
| Lap shear adhesion, psi (Al to Al at 0.2 in./min.) | | | | | | |
| at 72° F | 695 | 370 | 700 | 1250 | 585 | 860 |
| at 250° F | 3 | 1 | >250 | >250 | 105 | 148 |
| 180° peel adhesion, ppi (Al foil to molded polymer pad at 2 in./min.) | | | | | | |
| initial | 4.3 | 2.3 | 2.9 | 7.5 | 13.5 | 16.5 |
| hot water immersion (24 hrs. in 140° F water) | 3.2 | 2.5 | 3.5 | — | — | 12.0 |
| Tension adhesion, psi (Al to Al buttons at 0.2 in./min.) | | | | | | |
| at 72° F | 410 | 370 | — | 1040 | 480 | — |
| type failure | adhesive | adhesive | | boundary layer | cohesive | |

1. As can be seen from the data, by themselves the acrylic acid modified polypropylene exhibit far superior adhesion properties and strength at slightly elevated temperatures, i.e., 250° F. The EEA's show almost no strength at this temperature.
2. From other experiments, it is known that the ethylene structure of the EEA's enables them to cocrystallize with wax so as to reinforce wax based hot melts. The acid modified polypropylenes, which do not contain any ethylene-propylene elastomer, are not highly compatible with wax systems.
3. The EEA's are quite flexible whereas the acid modified polypropylenes tend to be somewhat brittle.
4. Both the EEA's and the acrylic acid modified polypropylenes exhibit poor molten pot stability. EEA/-wax systems discolored after 72 hours at 300° F even though they contained antioxidants and stabilizers.
5. The acid modified polypropylenes are not only noteworthy for their high bond strengths at room temperature but also for their ability to retain reasonable bond strengths at elevated temperatures. This latter feature is significant for those applications where adhesives or coatings would be subjected to autoclaving or boiling water.

EXAMPLE 9

Several adhesion blend compositions were prepared from grafted polymer components and ungrafted components. These compositions were evaluated for adhesion impact values at −10° F.

The results are summarized below in Table IX.

TABLE IX
LOW TEMPERATURE IMPACT ADHESION

Lap shear specimens were conditioned at −10° F and then manually impacted in a direction normal to the bond line.

| | Specimens Tested | |
|---|---|---|
| 25/75 | 200 MFR pp/Kraton 1107 | pass |
| 50/50 | 200 MFR pp/Elvax 40 | fail |
| | Elvax 40 | fail |
| 50/50 | EP-pp/FLEXON 845 | pass |
| 50/50 | EP-pp/Jayflex 205 | pass |
| 50/50 | EP-pp/Eastobond M5H | fail |
| 50/50 | EP-pp/Parmo petrolatum | fail |
| 50/50 | EP-pp/Indopol H-100 | fail |

EP-pp = 60 % polypropylene & 40 % VISTALON 3708 with 24 % acid & 1.8 MFR.

Kraton 1107 is a Shell styrene-isoprene adhesive grade block copolymer with about 20 weight percent styrene.

Elvax 40 is a 40 percent vinyl acetate copolymer with ethylene having a 57 melt index.

The other materials are commercial plasticizer or elastomer diluents. They are inexpensive and to the extent they can replace higher cost polymer components, and still perform well, they are beneficial.

From 1 to 100 percent of the olefinic component of the hot melt composition can be grafted.

Generally a hot melt composition of the invention will have from 5 to 95, preferably 20 to 80, and most preferably 40 to 60 weight percent of a thermoplastic component and from 95 to 5, preferably 80 to 20, and most preferably 60 to 40 weight percent grafted component.

Such a hot melt composition can be used per se as a finished formulation or used in quantities of from 40 to 95 weight percent as an adhesive intermediate component for a finished adhesive composition.

A preferred olefinic component comprises a blend of 80 to 90, preferably 40 to 60 weight percent of polyolefin plastic with 91 to 20, preferably 60 to 40 weight percent of polyolefin elastomers, in which either or both of the components have been grafted.

We claim:
1. polyolefin blend composition with outstanding adhesion characteristics, said blend having an MFR, when substantially $C_3$ based, or MI, when substantially $C_2$ based, of 1 to 1,000, which blend composition after blending has been extruder grafted with from 0.1 to 50 wt. percent of a monomer, wherein said monomer is selected from the group consisting of:
   a. a $C_3$ to $C_{10}$ unsaturated monocarboxylic acid;
   b. unsaturated polycarboxylic acids;
   c. melt salt and glycidyl derivatives of the foregoing;
   d. mixtures of the foregoing;
and whereby said polyolefin comprises 60 to 40 wt. percent of an elastomer selected from the group consisting of:
   i. ethylene/propylene copolymer elastomers;
   ii. ethylene/propylene diene monomer copolymer elastomers;
   iii. polyisobutylene elastomers;
   iv. butyl rubber elastomers;
   v. chlorobutyl elastomers;
   vi. combinations of the foregoing; and 40 to 60 wt. percent of a $C_2$ to $C_3$ polyolefin plastic.

2. The composition of claim 1 wherein said plastic is polypropylene.

3. The composition of claim 1 wherein said plastic is polyethylene.

4. The composition of claim 1 wherein said elastomer is an ethylene/propylene copolymer or an ethylene/propylene diene monomer copolymer and said plastic is polypropylene.

5. A composition according to claim 1 wherein said MFR or MI is from 10 to 300.

6. A composition according to claim 1 wherein said plastic is polypropylene and said MFR is at least 25 percent higher than said polyolefin blend composition after grafting.

7. A composition according to claim 1 wherein said monomer is acrylic acid.

8. A composition according to claim 1, wherein said monomer is glycidyl acrylate.

9. A composition according to claim 4, wherein said monomer is acrylic acid.

10. A composition according to claim 4, wherein said monomer is glycidyl acrylate.

* * * * *